United States Patent

[11] 3,634,677

[72] Inventors: Gerhard Wolffing-Seelig
 Stuttgart;
 Gerhard Conzelmann, Leinfelden-
 Unteraichen; Gunter Schirmer, Leinfelden;
 Helmut Domann, Leonberg, all of Germany
[21] Appl. No. 868,857
[22] Filed Oct. 23, 1969
[45] Patented Jan. 11, 1972
[73] Assignee Robert Bosch GmbH
 Stuttgart, Germany
[32] Priority Oct. 31, 1968
[33] Germany
[31] P 18 06 312.2

[54] LIGHTING CONTROL FOR MOTOR VEHICLE LAMPS
 23 Claims, 6 Drawing Figs.

[52] U.S. Cl. .................................................. 240/7.1 LJ,
 240/62.4
[51] Int. Cl. ..................................................... B60q 1/10
[50] Field of Search .......................................... 240/62.4,
 62.3, 62.1, 62, 7.1 LJ

[56] References Cited
 UNITED STATES PATENTS

| | | | |
|---|---|---|---|
| 2,846,551 | 8/1958 | Linder et al. ................. | 240/62.4 |
| 3,370,162 | 2/1968 | Biaband ...................... | 240/62.3 |

FOREIGN PATENTS

| | | | |
|---|---|---|---|
| 1,072,616 | 6/1967 | Great Britain................ | 240/7.1 |

Primary Examiner—Richard C. Queisser
Assistant Examiner—Ellen J. Koch
Attorney—Michael S. Striker ABSTRACT: A regulating arrangement for inclining lamps on a motor vehicle as a function of the inclination of the longitudinal axis of the vehicle with respect to the road surface. A potentiometer mounted between the chassis and the axle of the vehicle provides a signal representing the inclination of the axis of the vehicle with respect to the road surface. This signal serves as an input to a comparator which develops a difference signal by comparing the potentiometer output with a signal derived from the actual position of the lamp. The difference signal is amplified and applied to a positioning element in the form of a bimetallic member through which the lamps are positioned. A second potentiometer is used to provide the feedback signal for the comparator as a function of the actual displacement of the lamp.

INVENTORS
Gerhard WÖLFFING-SEELIG
Gerhard CONZELMANN
Günter SCHIRMER
Helmut DOMANN
By their ATTORNEY

PATENTED JAN 11 1972 3,634,677

INVENTORS
Gerhard WÖLFFING-SEELIG
Gerhard CONZELMANN
Günter SCHIRMER
Helmut DOMANN
By

*Michael J. Striker* their ATTORNEY

LIGHTING CONTROL FOR MOTOR VEHICLE LAMPS

BACKGROUND OF THE INVENTION

The present invention resides in an arrangement for maintaining constant the range of searchlights on motor vehicles with the aid of positioning members. These positioning members incline the searchlights of headlamps with respect to the longitudinal axis of the motor vehicle, as a function of the inclination to this longitudinal axis of the motor vehicle with respect to the driving path. The inclination of the axle of the motor vehicle with respect to the driving path is sensed through transducers. Unevenness or irregularities of different paths or highways require that spring and damping elements be arranged between motor vehicle and its driving wheels. As a result, the position of the motor vehicle with respect to the road is a function of the load. When the axles of the motor vehicle are loaded unequally, the inclination of the longitudinal axis of the motor vehicle also becomes varied with respect to driving path. These occurrences are of no consequence from the viewpoint of visibility during daylight. However, these occurrences may be detrimental for the driver of the motor vehicle and for others in the traffic picture, when artificial light is established through searchlights or headlamps mounted on the motor vehicle. This is because the illumination of the driving path varies with the inclination of the motor vehicle, and the drivers in vehicles on the opposite sides of the road may become blinded to the extent that they can no longer see or recognize the road in front of them.

For the purpose of preventing such blinding of drivers on the other side of the road, the headlamps must be able to emit light which exits from the headlamp only at it s upper half, and is inclined with respect to the road surface, so that the drivers on the opposite side of the road do not become blinded therefrom. The arrangement is such that the light rays are directed below the sight level of the drivers who sit above the dimmed lights. If, now, the motor vehicle is not symmetrically loaded, os that the spring elements of the front rear axle are compressed more than the spring elements of the front axle, then the motor vehicle becomes inclined towards the rear. As a result of such inclination of the motor vehicle, the dimmed light beam can blind the driver in the next land of he road. In addition to this, the inclination of the motor vehicle causes a light beam of the headlamps of the vehicle to be inclined upward with respect to the road surface, and accordingly the necessary illumination for the road is very inadequate.

To prevent such disturbing effects resulting from the inclination of the motor vehicle, it is known in the art to incline the headlamps with the aid of positioning members, as a function of the inclination of the longitudinal axis of the motor vehicle. Difficulties are incurred, however, in matching precisely the inclination of the headlamp of searchlight to the required illuminating relationships. Thus, small errors in positioning the headlamps for longer distances produce considerable variations in the required illuminating conditions.

Accordingly, it is an object of the present invention to avoid such disadvantages, and to provide an arrangement for maintaining constant the range or light distance of headlamps or searchlights on motor vehicles. It is also an object of the present invention that such arrangement be simple in design and of durable construction. It is furthermore an object of the present invention to provide such an arrangement which may be built into headlamps of motor vehicles with little additional cost. The arrangement of the present invention is to operate, moreover, in a precise manner, so that no traffic problems occur through undesirable illuminating conditions.

To achieve the preceding objects, the present invention provides for an arrangement with a closed regulating circuit which has an input parameter derived through transducers from the inclination of the axis of the motor vehicle with respect to the road surface. The output of this regulating circuit represents the inclination of the headlamps or searchlights of the motor vehicle with respect to the vehicle axis. The regulating circuit includes comparator means for comparing the output with the input, and converting the difference through a suitable transducer. The use of a closed regulating circuit makes possible a very simple construction of the arrangement. The positioning member which varies the inclination of the headlamps, for example, is not required to be a precision instrument. This results from the condition that nonlinearities in its characteristics become compensated through the regulating circuit. It is possible for example to use a heated bimetallic element as the positioning member, in place of a costly driving motor with a threaded spindle.

A mechanical coupling of both headlamps with one positioning member for their inclination can be omitted, when a separate regulating circuit is provided for each headlamp, and the same input parameter is applied to both regulating circuits.

In a preferred embodiment of the present invention, the regulator is constructed in the form of an electronic regulating amplifier which has feedback for the purpose of producing a desired timing relationship. The timing relationship or time delays may be produced by the feedback circuits so that the regulating amplifier be designed in the form of an integrating regulator.

In setting the inclination of the headlamps or searchlights, small residual deviations or errors in the regulating parameter from a determined input value, produce substantially large variations in the illuminating conditions. In view of this situation, the regulator with integral control is particularly advantageous, since with such control, no substantial residual regulating deviations or errors remain. Thus, in such control, the resulting regulating or output parameter corresponds precisely to the input quantity. In other types of regulators, a residual output error cannot be avoided. Two-point regulators, for example, first become actuated when a predetermined output error is exceeded, and this threshold value remains as an output error. In so-called proportional control regulators which position the output in accordance with the input through precise amplifiers, no positioning action takes place when the input magnitude is so small that the amplifier is not responsive thereto. Thus, when the input is substantially small, the positioning member connected to the regulating loop cannot be driven through the amplifier against the friction and similar such cases. In regulators with integral control, however, a very small input magnitude becomes integrated over time, and as a result the output of the amplifier becomes sufficiently large to position correspondingly the load attached to the regulating loop or the positioning member.

In designing the regulator in the form of an electronic regulating amplifier, it is possible to construct at least parts of the amplifier through integrated circuitry, particularly when the feedback loop is made of capacitances and/or resistors. The fabrication of the regulating amplifier in integrated circuitry form is particularly advantageous for mass production as, for example, for installation in mass-produced motor vehicles.

In the use of a bimetallic element for varying the inclination of the headlamps, the bimetallic strip assumes advantageously a quiescent or inoperative position at an intermediate heating energy. The output quantity which prevails in the amplifier when the regulating parameter is zero, has then a constant value. Through variations in this value, the inclinations of the headlamps may be set for unloaded motor vehicles, and as a result, errors when installing the headlamps on the vehicle and the individual elements of the regulating circuit, may be compensated.

SUMMARY OF THE INVENTION

An arrangement for inclining or rotating headlamps of a motor vehicle in accordance with the inclination of the longitudinal axis of the vehicle with respect to the road surface. The inclination of the motor vehicle is determined through transducers mounted between the chassis and the axle of the motor vehicle. The transducers apply input signals to a comparator which, in turn, develops an error signal for an amplifier that drives a positioning element in a closed regulating loop. A further transducer connected to the positioning element serves as the feedback member for applying a feedback signal to the comparator from which a difference signal is established. The positioning element, which may be in form of a bimetallic strip, serves to position the headlamp as a function of the inclination of the motor vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
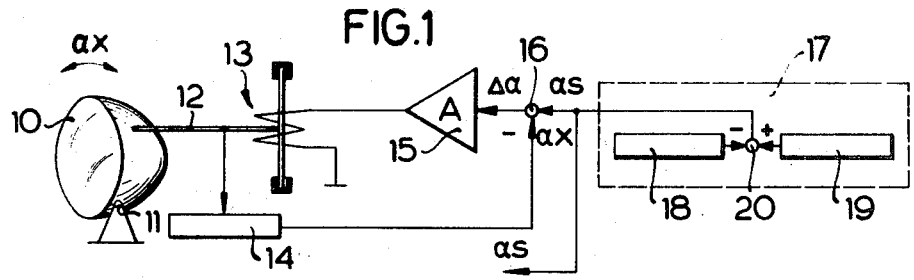
FIG. 1 is a schematic representation of a closed loop regulating circuit of the present invention.

Referring to the drawing and in particular to FIG. 1, a searchlight 10 pivotable about a horizontal axis 11, and its inclination may be varied through an angle $\alpha x$. The searchlight is adapted for motor vehicles and is pivoted about this horizontal axis 11 through a transmission rod 12 and a positioning member 13. The angle $\alpha x$ is the regulating parameter of the regulating circuit to be described. A transducer 14 is schematically coupled to the transmission rod 12, and converts the angle $\alpha x$ into a corresponding measurable parameter. The positioning member 13 is connected with the output of a regulating amplifier 15 to which the parameter $\Delta\alpha$ is applied to the input. The parameter $\Delta\alpha$ is designated as the regulating quantity, and is realized from the comparator 16 which computes the difference between the input quantity $\alpha s$ and he output quantity $\alpha x$ realized as feedback from the transducer 14. The input quantity $\alpha s$ is generated in the arrangement 17. The latter includes two elements 18 and 19 from which a single quantity is derived through a comparator 20, for the purpose of producing the inclination with respect to the motor vehicle longitudinal axis, or the input $\alpha s$ of the regulating circuit. FIG. 1 shows only one regulating circuit for one searchlight. The branching off of the output of the arrangement 17 designates the condition that a number of similar regulating circuits may be controlled from this input parameter $\alpha s$.

Figure 2:
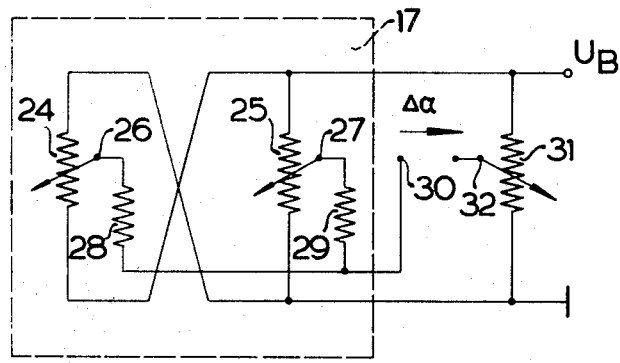
FIG. 2 is an electrical schematic diagram and shows the arrangement of transducers for determining the inclination of he motor vehicle with respect to the road surface, in accordance with the present invention.
Figure 3:
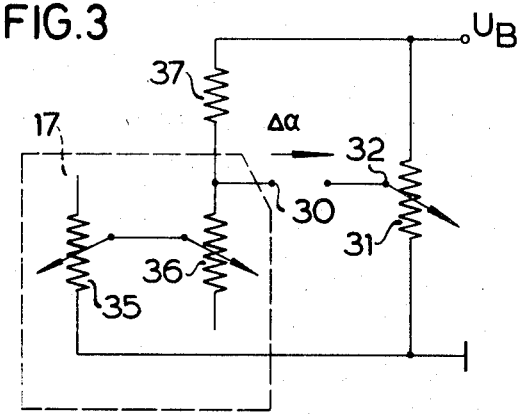
FIG. 3 is another embodiment of the arrangement of FIG. 2.

FIGS. 2 and 3 show possible embodiments for the arrangement 17. This arrangement operates in conjunction with a regulating circuit in which electrical signals are processed. Pneumatic or hydraulic regulating circuits are, however, also usable.

The arrangement 17, in accordance with FIG. 2, includes two potentiometers 24 and 25 with slidable contacts 26 and 27. The upper terminal of the potentiometer 25 is connected with the voltage-operating source $U_B$, whereas the lower terminal is connected to ground potential or the common return terminal of a motor vehicle battery not shown. The potentiometer 24 is connected so that its upper terminal is tied to ground potential, and its lowermost terminal is connected to the potential $U_B$. As a result of these interconnections of the potentiometers 24 and 25, opposite voltages appear at the sliding contacts 26 and 27 for identical positions of the sliding contacts. These two sliding contacts of the potentiometers are, moreover, connected to a common circuit point 30, through decoupling resistors 28 and 29. A third potentiometer 31 is connected across the voltage source $U_B$, and serves as the generator for the regulating parameter $\alpha x$. The parameter $\Delta\alpha$ appears between the tap 32 and the circuit point 30, as described subsequently.

The arrangement 17 in accordance with FIG. 3, includes two potentiometers 35 and 36 having sliding contacts connected to each other. The lower terminal of the winding of he potentiometer 35 is connected to ground potential, whereas the upper terminal of the winding of this potentiometer 35 remains floating. In the case of the potentiometer 36, he lower terminal remains floating, and the upper terminal is connected, through a resistor 37, to the operating voltage $U_B$. Another potentiometer 31 similar to that described in relation to FIG. 2, is also provided as the generator for the regulating parameter $\alpha x$. This potentiometer 31 is also connected across the operating voltage $U_B$. The upper terminal of he potentiometer 36 is connected to the circuit point 30. The parameter $\Delta\alpha$ appears between this circuit point 30 and the tap or siding contact 32 of the potentiometer 31. In both FIGS. 2 and 3, the arrangement 17 includes the potentiometer 31 in the form of a bridge circuit. The bridge diagonal lies between the two bridge center points 30 and 32.

Figure 4:
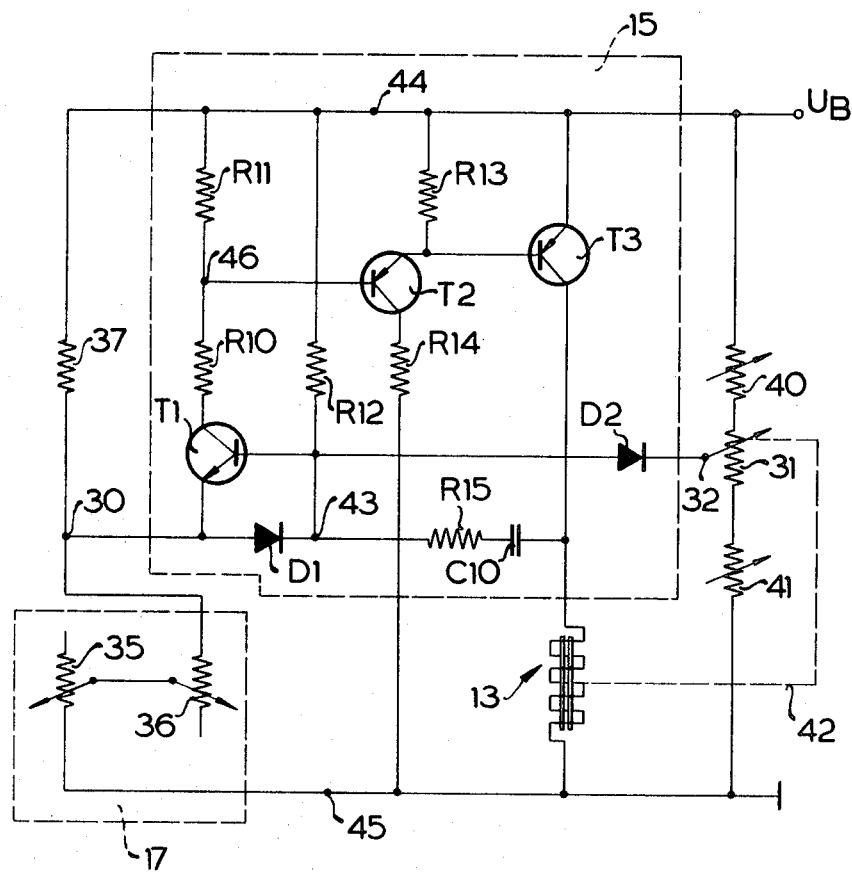
FIG. 4 is an electrical schematic diagram of a regulating amplifier used in the control loop of FIG. 1.

FIG. 4 shows a regulating circuit which uses a generator arrangements 17 in accordance with FIG. 3. The latter is connected in series with a resistor 37 and forms, thereby, the left bridge branch of the bridge in which the right branch consists of the potentiometer 31 with its sliding contact 32 and two setting or trimming resistors 40 and 41 which are connected in series with he winding of this potentiometer 31. These resistors 40 and 41 serve for setting the upper and lower value for the right branch of the bridge. The sliding contact of the potentiometer 31 is mechanically coupled with the positioning member 13, through linkage mechanism designated by the dashed lines 42.

The regulating parameter $\Delta\alpha$ is derived between the circuit points 30 and 32, and is applied to the regulator 15 which has its output connected with the positioning member 13. The latter is constructed in the form of a heated bimetallic element. The thermal energy for this bimetallic element is supplied by the transistorized amplifier in the regulator 15.

The regulator 15 is constructed of transistors T1, T2 and T3. The transistor T1 which is of the NPN-type, has its emitter connected to the circuit point 30, whereas its base is connected to the circuit point 32, through the diode D2. A diode D1 is connected between the emitter and base of the transistor T1, so that the cathode of D1 is connected to the base and the anode to the emitter of this transistor T1. The cathode D1 is also connected to a circuit point 43 which is, in turn, connected to the anode of the diode D2. The collector of the transistor T1 leads to the potential $U_B$ through resistors R10 and R11. The potential $U_B$ is positive with respect to ground potential appearing at the terminal 45. The positive voltage $U_B$ is also applied to the circuit point 44. For purposes of determining the operating point of the transistor, the base of this transistor T1 is connected, through resistor R12, to the positive potential terminal or circuit point 44. The base of the transistor T2 is connected to the junction 46 between the resistors R10 and R11. The transistor T2 is of opposite conductivity type with respect to the transistor T1, and is therefore of the PNP-type. The operating point of a transistor T2 is, consequently, determined through the relationship of the resistors R10 and R11.

The emitter of transistor T2 is connected, through resistor R13, to the circuit point or terminal 44. The emitter of transistor T2 is is also connected to the base of a PNP-power transistor T3 with emitter connected directly to the circuit point 44. The collector of transistor T3 leads to the circuit point 45, and hence ground potential, through the positioning member or element 13. The collector of the transistor T3 also leads to the circuit point 43, via the series-connected capacitor C10 and resistor R15. This circuit point 43 is also connected through the base of the transistor T1. The series circuit of the preceding capacitor and resistor forms a feedback coupling. It is also possible to use only a combination of resistors or series and parallel-connected circuits of resistors and capacitors, for this feedback coupling. This feedback coupling receives the required time delay or hold of the regulator during operation.

The searchlight 10 is mechanically coupled to the positioning element, in FIG. 4, through linkage, not shown. In operation of this arrangement of FIG. 4, one of the two generators 18, 19; 24, 25; or 35,36 is connected with the front axle of the motor vehicle, whereas the other one of the generators is connected to the rear axle. When both axles of the motor vehicle are equally loaded, identical measured parameters appear at both generators. Through the opposite energization of the two generators, however, the two measured values nullify each other so that $\alpha s$ becomes zero. The generator 14 or 31 of the regulating parameters are set under these circumstances, so that the regulating parameter $\Delta \alpha$ is zero. The opposite energizing of the generator is shown, in a general manner, in FIG. 1 through the difference formation of a comparator 20. In the generator arrangement of FIG. 2, addition of the generator voltage values is realized through the use of resistors. For the purpose of raising the potential of the circuit point 30, it is necessary to add a constant voltage or to insert or set a predetermined regulating operating point, since the regulating parameter $\Delta \alpha$ is zero for equal or identical positions of the potentiometers 24 and 25. The searchlight assumes its normal, inoperative state, when the bimetallic strip is substantially deflected by one-half. The deflection of the bimetallic element corresponds to a predetermined amplifier output.

A very simplified operating method if realized through the arrangement in FIG. 3, when the potentiometer 35 is coupled to the front axis and the potentiometer 36 is coupled to the rear axle of the motor vehicle. For equal loading of the motor vehicle, the resistance variations of the potentiometers become equally displaced, so that no resistance variation occurs and the potential of the circuit point 30 remains constant. When the bridge circuits of FIG. 2 to FIG. 4 are used, the bridge diagonal functions as the comparator 16 in FIG. 1. If, now, the motor vehicle becomes unequally loaded, a positive or negative input quantity $\alpha s$ is realized, since the output parameter or regulating parameter $\alpha x$ still has the value of the preceding condition. As a result of the regulating amplifier has applied to it a positive or negative regulating quantity $\Delta \alpha$. Through the resulting output parameter of the regulating amplifier, the bimetallic element becomes heated more or less, until $\Delta \alpha$ at the input regulating amplifier is again zero.

The regulating amplifier in FIG. 4 is designed so that the base-emitter path of a transistor T1 lies in the bridge diagonal between the circuit points 30 and 32. For the purpose of compensating the base-emitter path of the input transistor T1 in its threshold voltage, through which the bridge is always determined, the conducting path of the diode D2 is opposite is opposite to the base-emitter path of the transistor T1 in the bridge diagonal. To the potential of each bridge point, the threshold voltage of a diode is added. Thus, the threshold voltage of the base-emitter diode of the transistor T1 is added to the potential of the circuit point 30, and the threshold voltage of the diode D2 is added to the potential of the circuit point 32. In this manner, the thermal dependency of the threshold voltage of the transistor T1 is compensated, at the same time. In place of the diode D2 which must have a temperature characteristic similar to that of transistor T1, it is also possible to use a transistor connected in the form of a diode. From the output of the transistor T3, a feedback coupling leads to the base of the transistor T1. The diode D1 is connected so that its conducting direction is opposite to the base-emitter path of the transistor T1 which is connected in parallel with the diode. Accordingly, the diode D1 protects the base-emitter path of the transistor T1 against excess voltages.

With sudden cutoff of the transistor T3, a negative step voltage appears at the emitter of this transistor. The magnitude of this negative step voltage corresponds substantially to the magnitude of the operating voltage. At the first instant, this step becomes transmitted, through the capacitor C10, to the base of the transistor T1. The diode D1 becomes, however, conducting thereby, so that a base-emitter path of the transistor T1 has applied to it only the threshold voltage of the diode D1 in the cutoff direction. The threshold voltage is fully adequate for turning off or cutting off the transistor T1. Through selective design of this feedback coupling, it is possible to make the regulator operate as a two-point regulator, a pulse amplifier, or an analog regulator. The operation of the unit as a pulse amplifier or clock pulse amplifier, has been found particularly advantageous in practice. The transistor T3 is, thereby, either turned on or off.

When the regulating parameter is zero, the output of he preceding amplifier oscillates with a predetermined frequency between both extreme values, so that an intermediate current flows through the positioning member which determines the position of the bimetallic element when the motor vehicle is unloaded. Due to the thermal delay of the bimetallic element, the regulating parameter $\alpha x$ appears at all times, even though the transistor T3 is driven or operated only into stable end states. The power losses from the transistor T3 are, thereby, less than those for an amplifier which is continuously driven.

Since the moving parts such as the potentiometer sliding contacts are subjectable to considerable changes or variations in motor vehicle operation, the generators using potentiometers must be mechanically well built to withstand such use. If inductive elements are used in the regulating circuit, the voltages may be derived from taps or contacts which are not slidable. Inductive generators or inductive potentiometers are particularly mechanically strong because of their simple construction. As a result, their precision in operation becomes little affected through their use in motor vehicles.

Figure 5:
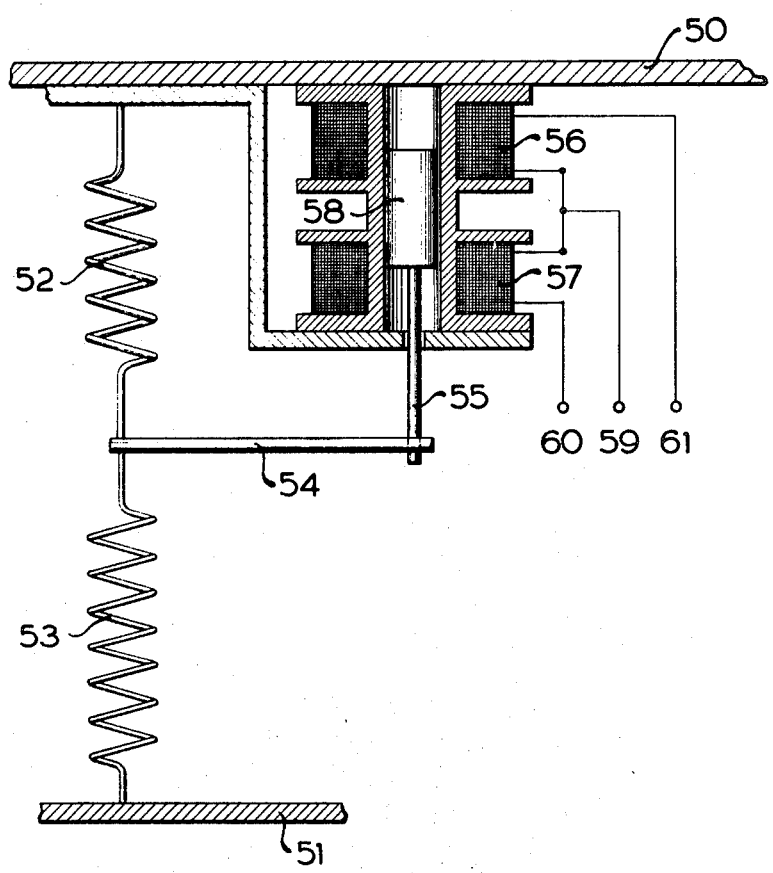
FIG. 5 is a schematic representation of an inductive transducer used as an input device for the control loop of FIG. 1.

In FIG. 5, an inductive generator is schematically shown. The chassis 50 of the motor vehicle is shown partially in cross-sectional form, and the member 51 is connected to one of the axles of the motor vehicle. A stiff spring 52 is joined to the chassis, and a soft spring 53 is secured to the axle. A lever 54 extends between the springs 52 and 53, and is linked to a rod 55 which is, in turn, secured to a movable ferromagnetic core 58 within coils 56 and 57. These coils are arranged axially one behind the other for the purpose of conserving space, and are electrically connected in series.

Through the arrangement of a stiff and a soft spring, the displacements of the ferromagnetic core 58 within the coils 56 and 57 correspond to the entire distance variations between chassis 50 and axle 51 of the motor vehicle. Through the arrangement of FIG. 5, such variations in distance are measured with sufficient linearity. If the motor vehicle is not loaded, the ferromagnetic core lies between both coils 56 and 57 to the extent that it is immersed equally deep within both coils. As a result, the inductance and thereby the reluctance of the coils are made equal. When the motor vehicle is unloaded, an alternating voltage applied to the terminals 60 and 61, becomes halved through the inductances of the coils 56 and 57. Accordingly, half of the applied alternating voltage is obtainable from terminal 59. By displacing the ferromagnetic core 58 within the coils 56 and 57, the voltages across these coils vary in accordance with the variations in their inductances.

In accordance with FIG. 5, the inductive generators may be built and then connected with the motor vehicle. This inductive generator is schematically shown in inductances in the arrangement of FIG. 6. An inductive transducer or generator 66 and 67 is provided for each axle of the motor vehicle, and inductive transducers 68 and 69 are provided with one for each searchlight. One of the terminals of each transducer is connected to the output of an oscillator 70, whereas the other terminal is connected to ground potential. Each inductive transducer is constructed of the coils 56 and 57 and the movable ferromagnetic core 58. Furthermore, a regulator 15 and a positioning member 13 is provided for each searchlight. The ferromagnetic cores of the inductive transducers for the regulating parameters are mechanically coupled to the bimetallic positioning members 13 which produced the inclination of the searchlights, not shown. Instead of using an inductive transducer for each axle of the motor vehicle, it is also possible to use a transducer for each wheel. In such a case, the transducer for a front wheel is oppositely connected electrically than the transducer for a rear wheel.

Figure 6:
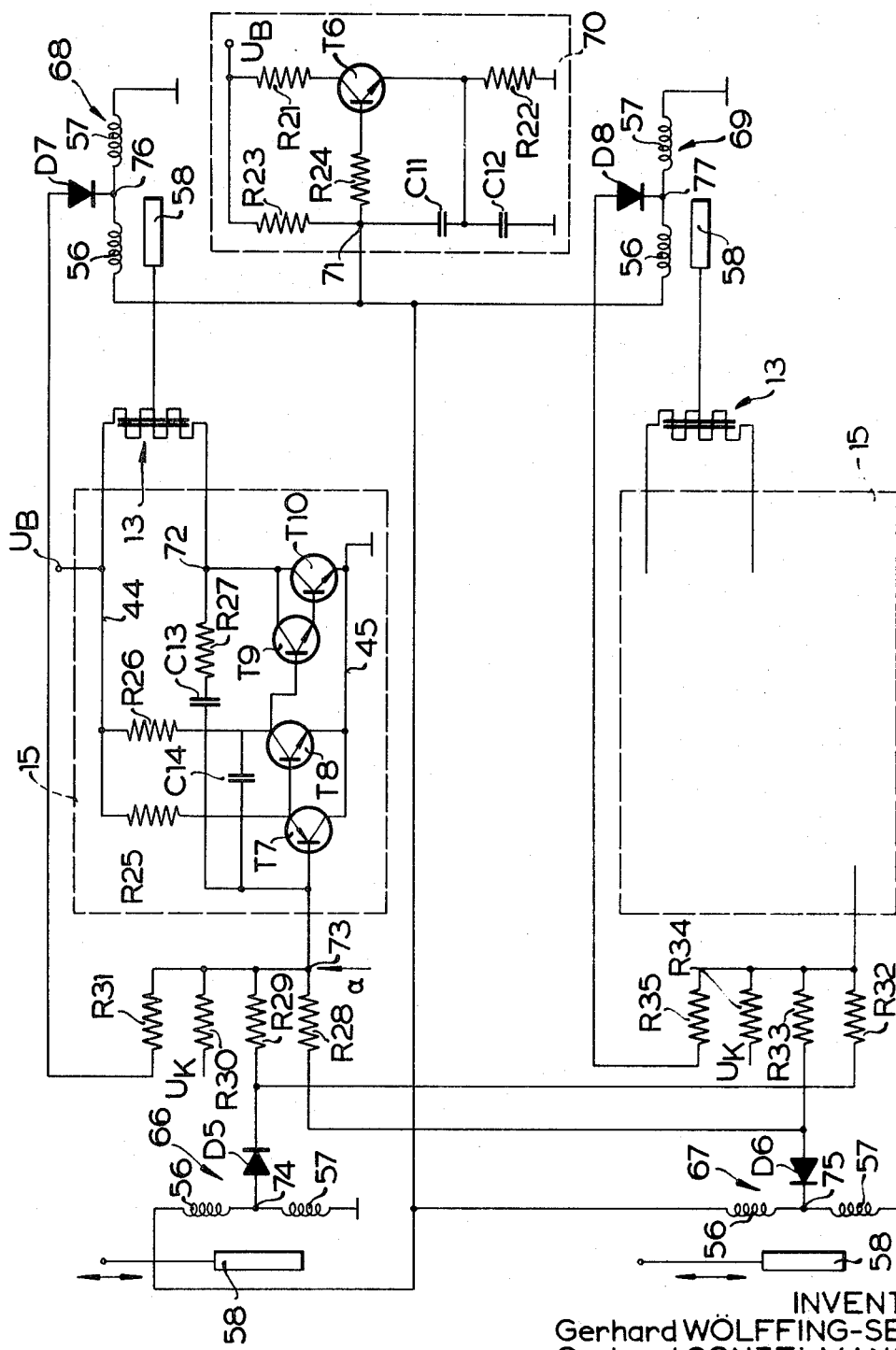
FIG. 6 is an electrical schematic diagram of the electronic control elements and their interconnections used in the regulating control loop of FIG. 1.

In the embodiment of FIG. 6, the inductive transducers are identically constructed for the inclination of the motor vehicle and the regulating parameter. As a result, a transducer of only a single design is required for the entire arrangement.

The inductances of the generator provide, at the same time, the inductances of the oscillator 70. The oscillator 70 includes an active element in the form of a transistor T6 with collector connected, through resistor R21, to the voltage source $U_B$. The emitter of this transistor T6 is connected to ground potential, through resistor R22. A resistor R24 is connected between the base of this transistor T6 and the circuit junction point 71. This circuit point 71 also leads to the potential $U_B$, by way of the resistor R23. At the same time, this junction 71 also leads to ground potential, through the series-connected capacitors C11 and C12. All inductive transducers or generators are connected to the circuit point 71, so that their inductances are connected in parallel. For different positions of the ferromagnetic cores within the inductive transducers, furthermore, the oscillator frequency remains constant. This results from the condition of the symmetrical arrangement whereby the increase in inductance of one coil, for each inductive transducer, the inductance of the other coil decreases correspondingly, when their ferromagnetic cores are displaced. Accordingly, the entire inductance remains unaltered.

In the embodiment of FIG. 6, the regulators 15 are designed in the form of four-stage transistor amplifiers including transistors T7 to T10. The potential $U_B$ is applied to the circuit line 44, and the circuit line 45 is connected to ground potential. The transistor T7 is of the PNP-type, whereas the transistors T9 to T10 NPN-type. The emitters of the transistor T8 and T10, as well as the collector of the transistor T7, are connected to the line 45 and hence to ground potential. The emitter of the transistor T7, furthermore, leads to the circuit line 44, through the resistor R25. At the same time, the collector of the transistor T8 also leads to this circuit line 44 through the resistor R26. The base of the transistor T8 is also directly connected to the emitter of the transistor T7, whereas the collector of the transistor T8 is directly connected to the base of the transistor T9. The emitter of the transistor T9 is directly joined to the base of the transistor T10. As a result, all transistors are galvanically coupled, and the transistors T9 and T10 are interconnected to form the darlington stage. The collectors of the transistors T9 and T10 are connected to each other and to the circuit point 72.

A bimetallic positioning element 13 is connected between the circuit point 72 and the circuit line 44. The heating coil of this bimetallic element (not shown) is energized from the collector current of the transistors T9 and T10. The series combination of the capacitor C13 and R27, is connected between the circuit point 72 and the base of the transistor T7. A further feedback connection in the form of the integrating capacitor C14 is connected between the collector of the transistor T8 and the base of the transistor T7.

The base of the transistor T1 is connected to a circuit point 73 at which the regulating parameter $\Delta\alpha$ appears. Four resistors R28 to R31 are, furthermore, connected to the circuit point 73. The resistors R28 to R31 of the upper regulating circuit, correspond to the resistors R32 to R35 of the lower regulating circuit. The regulator 15 associated with the lower circuit is precisely identical to the regulator described above.

The center tap or junction of the inductive transducer 66 for the purpose of measuring the motor vehicle inclination, is connected to the anode of a diode D5. The cathode of this diode leads to the circuit point 73 through the resistor R29.

The cathode of this diode D5 is, moreover, connected to the resistor R32 associated with the lower regulating circuit. The tap or junction 75 of the inductive transducer 67 is connected to the cathode of a diode D6, which has its anode connected to resistor R33 and R29. The diodes D5 and D6 are oppositely connected in the circuit. The resistors R31 and R35 are connected, respectively, to he anodes of the diodes D7 and D8. The cathodes of these diodes D7 and D8 are connected directly to the circuit junctions or taps 76 and 77 of the inductive transducers 68 and 69 for the regulating parameters. A compensating voltage $U_K$ is, furthermore, applied to the inputs of the regulators 15, through resistors R30 and R34.

In operation of the arrangement of FIG. 6, four voltages are added through the four resistors at the input of each regulator 15. This addition is performed in a manner similar to that performed by summing amplifiers in analog computers. The magnitude of the compensating voltage $U_K$ determines the quiescent current of the positioning element 13. It is also taken through a diode, not shown, from the oscillator 70. The voltages from the inductive transducers for the inclination of the motor vehicle are added through the resistors R28 and R29. The sign of the summation at the input of each amplifier 15, is determined through the direction of current flow of the diodes for each measured value. The voltages at the resistor R28 and R29 are out of phase by half of a wave. The influence of this phase shift is, however, compensated for through the subsequent regulator, as a result of the integrating capacitor C14. Even without such integrating action of the regulator, the influence of this phase shift is substantially nullified through the thermal inertia or delay of the bimetallic element. When the motor vehicle is unloaded or equally loaded with the voltage $U_K$ at the resistor R30, then the voltage which represents the inclination of the searchlight, becomes compensated from the inductive transducer for the regulating parameter, when the searchlight is in the predetermined inoperative position. The voltage $U_K$ serves, thereby, as the desired input value for the initial inclination of the searchlight. The initial inclination of the searchlight cannot be determined through the cold state of the bimetallic element. This results from the condition that under these circumstances, the searchlight can be displaced in only one direction, and the initial inclination would be thereby made dependent upon the surrounding temperature.

The regulator functions in the form of an integral regulator. The integration time constant is determined substantially from the magnitude of the integrating capacitor C14. The regulator, furthermore, functions rhythmatically, so that the transistor T10 which provides substantially the entire current for hearing the bimetallic element, is either fully turned on or fully turned off. The average values of the effective heating current prevail through the relationship from the times that the transistor is turned on and turned off. In view of the thermal delay or the thermal inertia, of the bimetallic element, the searchlight which is coupled to the positioning element does not become displaced suddenly through the oscillation of the regulator, but is instead displaced in a continuous fashion. If, for example, the parameter $\Delta\alpha$ is zero, then the regulator oscillates with a frequency which is substantially determined from the resistor R27, the capacitor C13, as well as the integrating capacitor C14.

The transistor T10 conducts at a predetermined instant of time. The input voltage at the base of the transistor T7 then assumes a potential which is substantially positive by a small amount with respect to the ground potential. Since the transistor T7 is connected as an emitter follower, its emitter also becomes somewhat positive, and the transistor T8 which was turned off beforehand, begins to conduct somewhat. The base of the transistor T8 is connected to the emitter of the transistor T7. When the transistor T8 commences to conduct somewhat the positive potential of its collector decreases. The variation of the collector potential transistor T8 is transmitted, through the integrating capacitors 14, to the transistor T7. This action has the opposite effect to the input magnitude applied to the transistor T7, and takes place until the capacitor C14 becomes charged to the prevailing voltage. Through the decrease of the positive potential at the collector of the transistor T8 within a time interval determined by the integration time constant, the subsequent darlington stage consisting of transistors T9 and T10 becomes turned off. This cutoff step leads to a switching step through the feedback of the capacitor C13 and the resistor R27, since the amplification between the base of the transistor T7 and the collector of the darlington stage T9, T10 is substantially high and the feedback functions as a coupling. Since the voltage across the capacitor C13 cannot change instantaneously in a stepwise manner, the positive step voltage at the current point 72 becomes transmitted to the base of the transistor T7. The latter becomes, thereby, turned off and can first become again conducting when the capacitor C13 has discharged.

The potential at the base of the transistor T7 corresponds to the regulating parameter $\Delta\alpha$, and when this base potential assumes a positive value, the transistor T7 becomes again conducting after a considerably shorter time. This results from the condition that the capacitor C13 must discharge to a lower voltage value. The time interval during which the transistor T10 is turned off, is thereby shorter. Conversely, this time interval becomes increased when the voltage at the base of the transistor T7 becomes negative relative to the ground potential. The variable current circulated through the bimetallic element varies the bending of the latter until the inductive transducer coupled thereto provides a signal to the input of the amplifier so that the voltage appearing at the circuit point 73 becomes nullified.

The unsteady and periodic operation of the regulator is of advantage for the power transistor T10, since only a substantially small power loss is thereby incurred. Aside from this, stray signals of the transistors do not effect severely the regulator, since the latter operates as a clock signal amplifier or periodic signal amplifier, and consequently over the entire amplification of the regulator is substantially inhibited on its timing.

It will be understood that each of he elements described above, or two or more together, may also find a useful application in other types of constructions differing from the types described above.

While the invention has been illustrated and described as embodied in motor vehicles searchlights, it is not intended to be limited to the details shown, since various modifications and structural changes may be made without departing in any way from the spirit of the present invention.

What is claimed as new and desired to be protected by Letters Patent is set forth in the appended claims:

1. A regulating arrangement with a closed control loop for maintaining constant the range of at least one lamp on a motor vehicle, comprising, in combination, first transducer means for providing a signal representing the inclination of the longitudinal axis of said motor vehicle with respect to the path of motion of said vehicle; second transducer means coupled to said lamp for providing a signal representing the inclination of said lamp; comparator means connected to said first and second transducer means, said comparator means comparing said signals from said transducer means and providing a difference signal for positioning said lamp; and positioning means connected to receive as input said difference signal for inclining said lamp so as to maintain constant the range of the latter despite inclination of the longitudinal axis of said motor vehicle, the first and second transducer means, said comparator means, and said positioning means constituting a closed control loop.

2. The regulating arrangement as defined in claim 1, including a plurality of lamps, a separate said positioning means for each lamp, each said positioning means receiving as input said difference signal.

3. The regulating arrangement as defined in claim 1 including amplifier means connected to the difference signal output from said comparator means said amplifier means having feedback means for producing a predetermined response time.

4. The regulating arrangement as defined in clam 3, wherein said amplifier means is an integrating amplifier.

5. The regulating arrangement as defined in claim 3, wherein said amplifier means includes means for setting the output of said amplifier means to a constant value when said positioning means for inclining said lamp is substantially at zero position.

6. The regulating arrangement as defined in claim 5, further including means for conducting a signal of constant magnitude to the input of said amplifier means for setting said positioning means to zero.

7. The regulating arrangement as defined in claim 3, wherein said amplifier means is an astable trigger switching between two stable output voltages at a rate in dependence on said difference signal.

8. The regulating arrangement as defined in claim 1, including a plurality of lamps, a separate said positioning means for each lamp, each positioning means receiving as input said difference signal.

9. The regulating arrangement as defined in claim 1 wherein said first transducer means comprises at least one transducer arranged between each axle and the chassis of said motor vehicle, said transducer converting the variation in distance between said axle and said chassis into corresponding electrical signals.

10. The regulating arrangement as defined in claim 9, wherein a separate transducer is coupled operatively to each wheel of said motor vehicle.

11. The regulating arrangement as defined in claim 9, wherein said first transducer means comprises two voltage dividers with displaceable contacts connected together; a source of voltage; a resistor connected between said source of voltage and one terminal of a first one of said voltage dividers the other terminal of said first one voltage divider being in floating state, the second one of said two voltage dividers having one terminal floating and having one terminal connected to ground potential.

12. The regulating arrangement as defined in claim 11, including further voltage-dividing means with displaceable contact, said further voltage-dividing means being connected between said source of voltage and ground potential, said difference signal appearing between the sliding contact of said further voltage-dividing means and the junction between said first one of said voltage dividers and said resistor connected thereto.

13. The regulating arrangement as defined in claim 9, further including a voltage source, and wherein said first transducer means comprises first and second voltage dividers of which corresponding fixed terminals are connected to opposite poles of said voltage source, and further including respective resistor means connecting the taps of said first and second voltage dividers to a common circuit point, the resulting voltage at said common circuit point being said signal of said first transducer means.

14. The regulating arrangement as defined in claim 13, further including a third voltage divider connected in parallel with said first and second voltage dividers, the voltage at the tap of said third voltage divider being said difference signal.

15. The regulating arrangement as defined in claim 14, further including transistor amplifier means, said transistor amplifier means having an input and an output, said input being connected to said common circuit point, said output being connected to the input of said positioning means.

16. The regulating arrangement as defined in claim 15, wherein said transistor amplifier means includes an input transistor of which the emitter is connected to said common circuit point and the collector is connected to said source of voltage, and further including diode means connected between the base of said input transistor and the tap of said third voltage divider, said diode being reverse connected so as to oppose the flow of the base emitter current of said input transistor.

17. The regulating arrangement as defined in claim 1, wherein said first transducer means comprises first and second potentiometers of which the adjustable tap of said first potentiometer is moved in dependence on the position of a front axle of the motor vehicle and the adjustable tap of said second potentiometer is moved in dependence on the position of a rear axle of the motor vehicle.

18. The regulating arrangement of as defined in claim 1, wherein said first transducer means comprises for a front axle and a rear axle respective inductive voltage-dividing means with two coils connected in series and a ferromagnetic core displaceable with the interior of the two coils and connected to a respective said axle, and means for supplying an alternating current voltage to said two coils.

19. The regulating arrangement as defined in claim 18 wherein said means for supplying an alternating current voltage is an oscillator, said oscillator being common to the two pairs of coils of said first transducer means, the inductance of said oscillator comprising said two pairs of coils.

20. The regulating arrangement as defined in claim 19, wherein said second transducer comprises voltage-dividing means with two coils connected in series and a ferromagnetic core movable within said two coils in response to the inclination of said lamp, said oscillator energizing said two coils, the inductance of said oscillator comprising said two coils.

21. The regulating arrangement as defined in claim 19, further including a first diode connected to the junction between said two coils of one inductive voltage-dividing means for rectifying the positive half waves; a second diode connected to the junction between said two coils of the other inductive voltage-dividing means for rectifying the negative half wave; summing resistor means connected to the first and second diodes for summing the outputs thereof, the resulting summed voltage being said signal of said first transducer means; and amplifier means having an input and an output, said input being connected to said summing resistor means, said output being connected to the input of said positioning means.

22. The regulating arrangement as defined in claim 21, further including means for connecting the output voltage of said oscillator to said summing resistor means for providing a variable compensation voltage for determining the inclination of the lamp when the longitudinal axis of he motor vehicle is not inclined.

23. The regulating arrangement as defined in claim 1 wherein said positioning means is a bimetallic element.

* * * * *